No. 770,653. PATENTED SEPT. 20, 1904.
T. H. PRICE.
COTTON HARVESTER.
APPLICATION FILED DEC. 18, 1903.
NO MODEL. 3 SHEETS—SHEET 3.
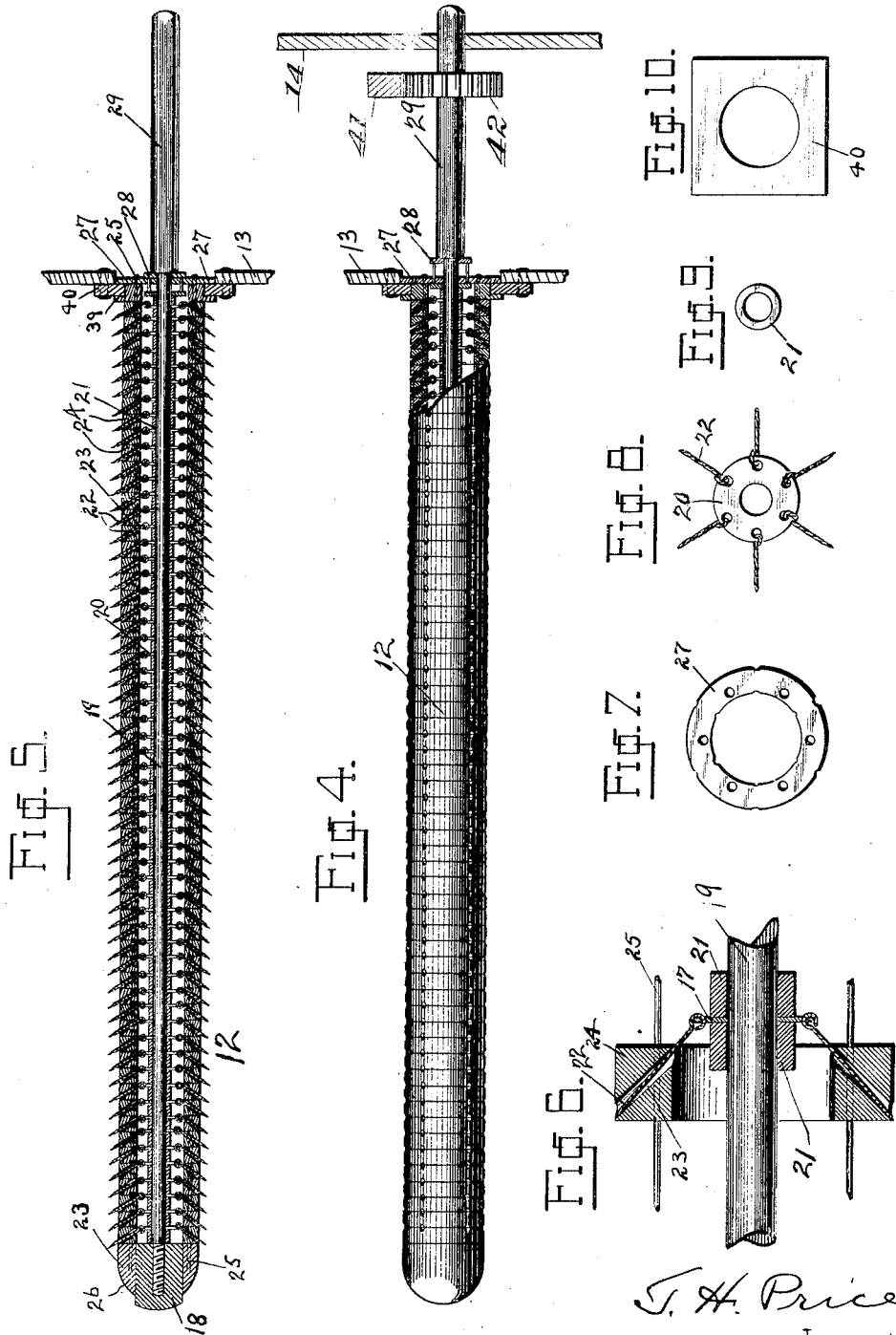

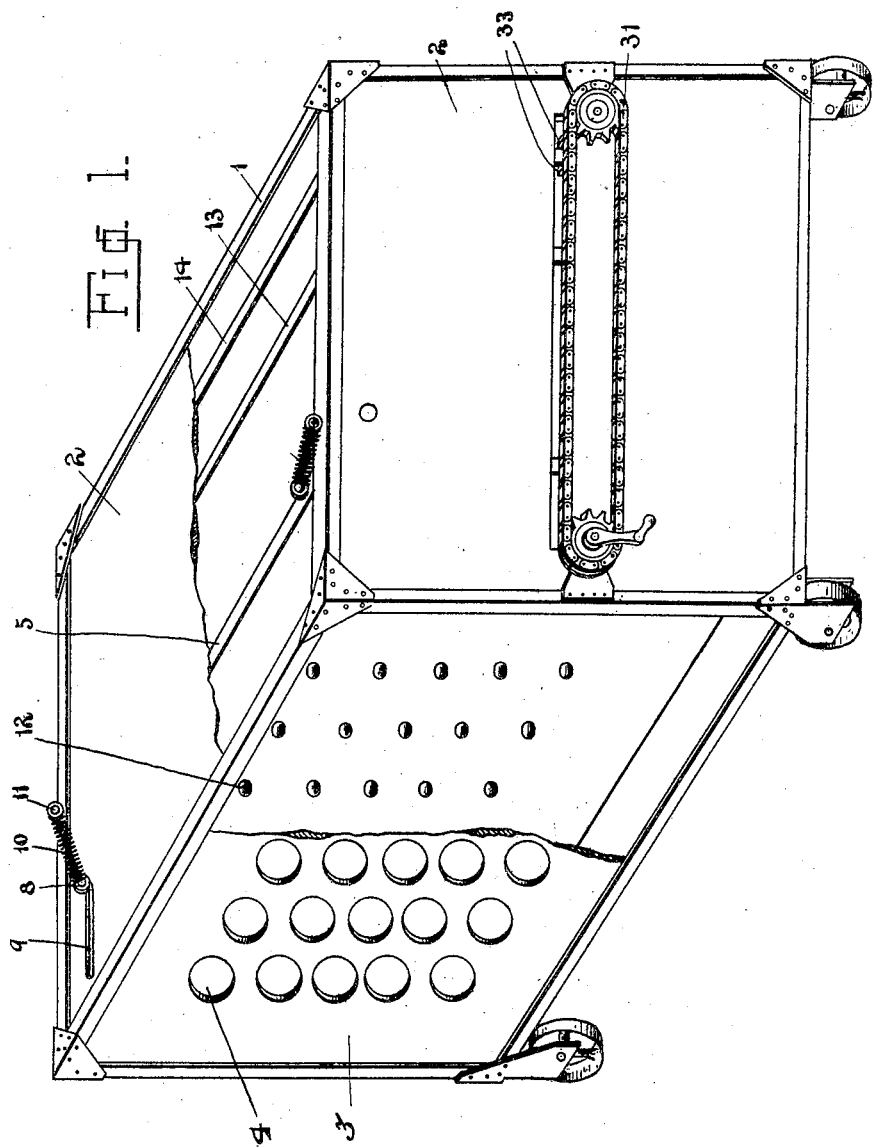

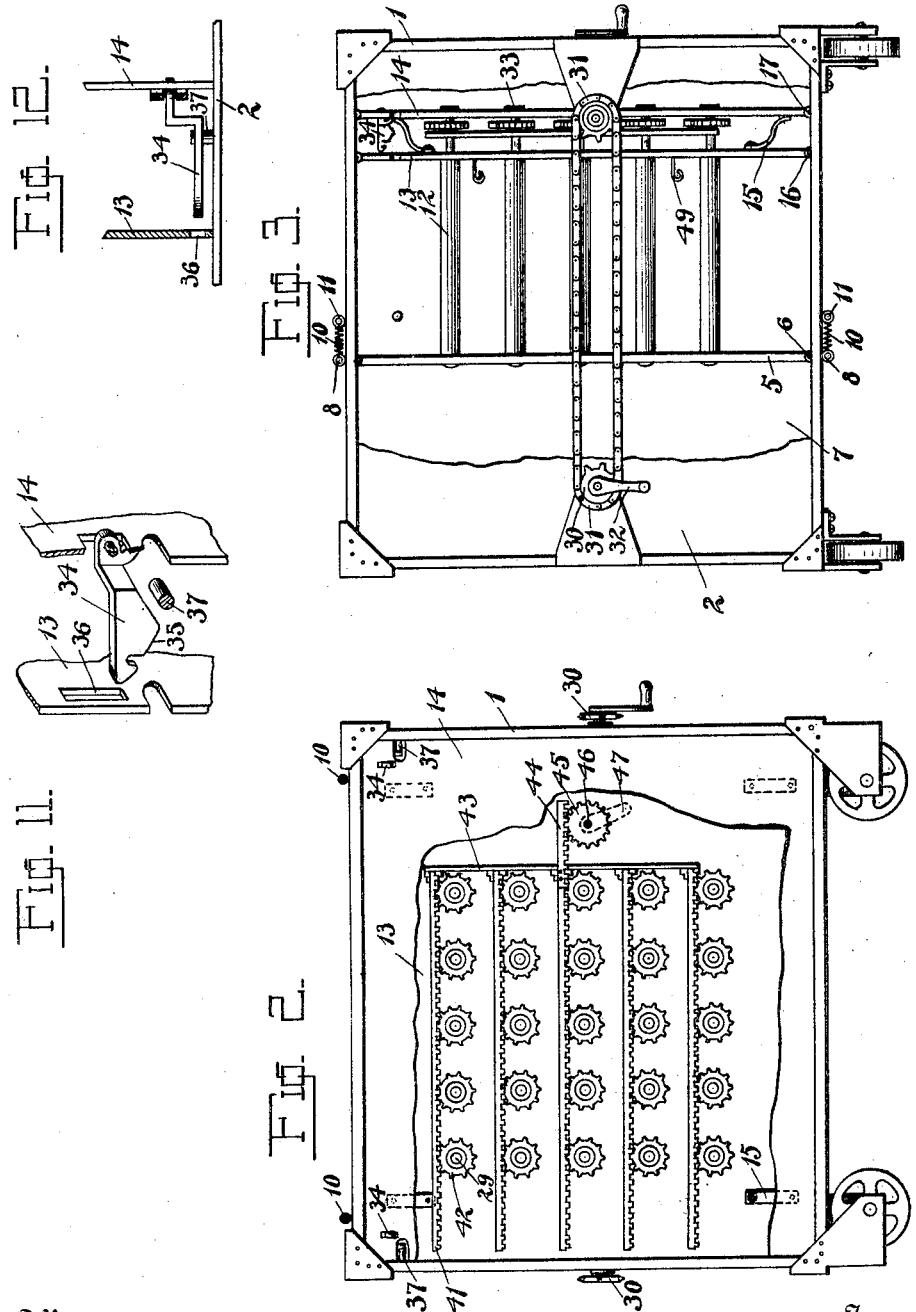

No. 770,653. Patented September 20, 1904.

UNITED STATES PATENT OFFICE.

THEODORE H. PRICE, OF NEW YORK, N. Y., ASSIGNOR TO UTILITY COTTON PICKER COMPANY, OF NEW YORK, N. Y., A CORPORATION OF NEW YORK.

COTTON-HARVESTER.

SPECIFICATION forming part of Letters Patent No. 770,653, dated September 20, 1904.

Application filed December 18, 1903. Serial No. 185,646. (No model.)

*To all whom it may concern:*

Be it known that I, THEODORE H. PRICE, a citizen of the United States, residing in the borough of Manhattan, in the city and State of New York, have invented certain new and useful Improvements in Cotton-Harvesters, of which the following is a specification.

My invention relates to cotton-harvesters, and particularly to that class of cotton-harvesters which are adapted to take the cotton fiber from the bolls on the growing plant in the field.

In my present invention I employ a series of picking-fingers from which are projected a series of picking points or prongs after said fingers have been projected from the casing of the machine into operative position in the growing cotton-plants.

My invention further consists in the provision of means for projecting and retracting the said fingers and picking points or prongs and in means for rotating the said picking-fingers after the same have been projected to their operative positions to perform the collecting function.

A cotton-harvester constructed in accordance with my invention provides for the projection of the picking-fingers into the cotton-plants without disturbing and entangling the same, thereby making the machine far more efficient in use. For this purpose in the structure herein described I have provided an improved means whereby the picking-fingers are first projected axially and without substantial lateral motion into operative positions in the cotton-plants, after which the picking points or prongs are projected from said picking-fingers.

I furthermore provide an improved means for removing the cotton fiber from the picking points or prongs and depositing the same into the machine-casing by retracting the picking-fingers axially and without substantial lateral movement until they are clear of the cotton in the field and then retracting the picking points or prongs and stripping the fiber from the pickers.

My invention furthermore relates to many improved details of structure hereinafter referred to and shown in the accompanying drawings, in which like reference characters refer to like parts, and in which—

Figure 1 is a perspective view of the machine embodying my invention with part of the casing removed and showing the front of the casing partly in section. Fig. 2 is a rear elevation of the same with the casing removed, showing the collapsible finger-frame broken away to show the finger-rotating mechanism carried thereby. Fig. 3 is a side elevation of the same with the casing removed, showing a side view of the stripping-plate, finger-frame, and actuating mechanism. Fig. 4 is an enlarged detail view, partly in section, showing one of the picking-fingers and in section its bearing on the front of the finger-frame. Fig. 5 is a central section through Fig. 4. Fig. 6 is an enlarged detail sectional view through one of the cotton-picking fingers, showing more clearly the means for mounting the picking points or prongs. Fig. 7 is a detail view of one of the annular end plates of the picking-fingers. Fig. 8 is a detail view showing one of the annular plates upon which the picking points or prongs are mounted. Fig. 9 is a detail end view of one of the washers for spacing the picking-points and their annular plates apart. Fig. 10 is a detail view of the collar-plate mounted on the front of the finger-plate and forming a bearing for the finger. Fig. 11 is a detail sectional perspective view of the latch and cam-pin for actuating the same. Fig. 12 is a detail plan view of the same parts.

Referring now in detail to the drawings, 1 is the frame, and 2 the casing, of a cotton-harvester embodying my invention, said frame being carried upon a suitable truck. The front 3 of casing 2 is provided with perforations 4. Vertically mounted in said frame 1 is a movable stripping-partition 5, mounted on rollers 6, which, together with the front 3 and the sides of the casing 2 of the machine, forms a compartment 7, into which the cotton which has been collected from the bolls is deposited, as hereinafter described, Fig. 1. Partition 5 is provided with upwardly-projecting lugs 8, engaging slots 9 in the top and bottom of the machine-casing 2.

10 is a spring secured at one end to lug 8 and at the other end to an eye 11.

12 represents the picking-fingers, mounted horizontally in casing 2 in line with perforations 4 and passed through perforations in the stripping-partition 5.

Positioned parallel to the stripping-partition 5 in the casing 2 is a finger-frame comprising a pair of plates 13 and 14, spaced and held apart normally by connecting-springs 15 of any suitable form, Fig. 3. Plates 13 and 14 are mounted on rollers 16 and 17, respectively. Each of the fingers 12 is constructed of a tube or cylinder rounded at its outer end and rotatively connected at its inner end to plate 13.

18 is a sliding tip mounted on the end of a sliding rod or bar 19, mounted centrally in the tube or cylinder, passing through plate 13 and rotatably connected at its inner end to the plate 14. On bar or rod 19 is mounted a series of annular plates 20, spaced apart by washers 21 and carrying at their peripheries radial picking points or prongs 22. Each of the points or prongs 22 is seated in a diagonal perforation 23 in the tube or cylinder, such perforations 23 being of sufficient size to allow for a free movement of the points or prongs 22 therein, Figs. 5 and 6.

I have constructed the fingers 12 of a series of rings 24, preferably of hard rubber, but which may be of any suitable material, said rings being mounted on rods or wires 25. One end of each of the wires 25 is seated in an annular tip 26 on end of finger 12, in which the tip 18 on the rod 19 slides, the other end of the wires 25 being secured to the annular end plate 27 at the opposite end of the finger.

28 is a sliding stop-frame mounted on the bar 19 and comprising a pair of plates connected by links passing through the end plate 27, one of said plates being on each side of the said plate 27. The inner plate of the frame 28 abuts one of the washers 21, while the outer plate of said frame abuts the shank 29 of the bar 19. On either side of the machine are gear-wheels 30, such gear-wheels being connected by chains 31 and provided with a crank 32 for operating the same. The chain 31 is provided with a pair of lugs or fingers 33, which engage the plate 14 of the frame 13 14.

Plate 14 of frame 13 14 has pivotally mounted thereon a latch 34, having a cam-surface 35 thereon. Mounted on plate 13 is a keeper 36, mounted in line with the latch 34.

37 is a pin seated in the casing 2 in the path of travel of the latch 34.

38 48 are slots in the plates 13 14, respectively.

As shown in Figs. 3, 4, and 5, each of the picking-fingers 12 are provided at one end with an annular flange 39, which, together with end plate 27, forms a groove or bearing for a collar-plate 40, (shown in detail in Fig. 10,) which plate forms a bearing of the picker. For rotating the picking-fingers after they have been projected into operative position I provide a rack-and-pinion means consisting of a series of racks 41 engaging pinions 42, mounted on the shanks 29 of the bars 19. Racks 41 are mounted on the frame 43, as shown in Fig. 2. Rigidly secured to the frame 43 is a supplemental rack 44, engaging pinion 45, mounted on a shaft 46, mounted in the plate 13. Shaft 46 is provided with a crank 47.

49 represents projections on plate 13.

Operation: The operation and use of the herein-described machine is as follows: The machine is adapted to be used in the field beside the growing cotton to take the place of the crude method of picking by hand heretofore employed. In practice the machine is wheeled to a suitable position beside the cotton-plants and after adjustment to such position the crank 32 is operated to feed the chains 31 and through lugs 33 on chains 31 the rear plate 14 of the finger-frame 13, 14 forward. As plate 14 is moved forward it carries the plate 13 forward, the two plates being held apart by springs 15 as they travel forward carrying the fingers 12, which slide through the partition 5 and pass through the perforations 4 in the front 3. When the projections 49 on the plate 13 strike the partition 5, they carry said partition forward until the same strikes the front of the machine, when it is stopped, at the same time stopping further movement in a forward direction of the plate 13. At this moment the picking-fingers have been projected their entire length out of the machine-casing 2 into the cotton-plants which surround the same. A further operation of the crank 32 will feed the plate 14 forward, overcoming the power of the springs 15 and therefore collapsing finger-frame 13 14. The effect of the collapse of the frame 13 14 is to produce a relative movement between the bars 19 and the fingers 12, such relative movement forcing the picking points or prongs 22 through the perforations 23 into operative position. From the foregoing it will be seen that the picking points or prongs 22 are not projected from the fingers 12 until the latter have been projected into their operative position. The advantage of this arrangement will be obvious. Were the points or prongs 22 projected before the fingers 12 are projected into their operative position the latter could not be pushed into their operative position without prematurely engaging the branches of the cotton-plant, thereby crowding and forcing the same away from the machine. With my structure, however, the fingers 12 are first projected through the branches of the cotton-plant, which fall naturally about the fingers, and then the cotton-picking points or prongs 22 are projected into their operative positions. With the fingers 12 and points or prongs 22 in operative position the crank 47 is next operated, rotating the fingers 12, and consequently the picking points or prongs 22, which engage the cotton fiber in the bolls and remove the same therefrom. In the collapsed position of the frame 13 14 the latch 34 will be in engagement with its keeper 36, thereby locking the two plates 13 and 14 together. As the plate 14 is moved forward through the casing and as the latch 34 passes the pin 37 the cam-surface 35 rides over the said pin 37, raising the latch 34. The movement of the partition 5 through the casing 2 is limited by the lugs 8 engaging the slots 9. Springs 10 tend to normally hold the partition 5 in its inner position. After the fingers 12 have been rotated in the manner described a suitable length of time the crank 32 is reversed. Upon reversal of crank 32 the frame 13 14 will be drawn backwardly through the casing 2, and locked by latch 34 in collapsed position, so that the picking-points which have gathered more or less cotton fiber are drawn into the casing 2 in their projected positions. As the frame 13 14 is drawn backwardly through the casing the partition 5 follows the same under tension of its springs 10 until the lugs 8 reach the end of the slots 9 in the casing 2. At this moment the cam-surface 35 on the latch 34 will ride over the pin 37, releasing the latch 34 from its keeper 36, allowing the plates 13 and 14 to be separated to an extent determined by the springs 15 connecting the said plates and to an extent sufficient to retract the picking points or prongs 22. The retraction of points or prongs 22 does not occur, however, until the fingers 12 have been entirely retracted into the casing. Further movement of the frame 13 14 after retraction of the points or prongs 22 draws the picking-fingers through the stripping-partition 5, the perforations in which fit snugly about the said fingers, and the cotton which has been collected by the picking points or prongs is therefore stripped off of the said fingers and falls into the compartment 7. The perforations 4 in the front 3 are of sufficient diameter to permit the retraction of the fingers 12 within the casing with the points or prongs 22 extended. Upon completion of the above-described operation the compartment or receptacle 7 is left free of the picking mechanism, so that the cotton fiber may be readily removed therefrom. It is obvious that the machine may be manipulated in the above-described manner any number of times until the compartment 7 is completely filled.

I do not wish to be understood as limiting myself to the specific structure herein shown and described, since the same may be varied without departing from the spirit of my invention. What I claim, broadly, as my invention is means for mounting the picking-fingers so that the same may be projected axially and without substantial lateral motion into operative position, means for projecting the picking points or prongs after the fingers have been projected into their operative position, means for retracting the picking-fingers with the points or prongs still projected until after the said fingers have been entirely retracted into the casing of the machine, means for automatically retracting the said points or prongs after the said fingers have been retracted wholly within the casing, and the means for stripping the cotton from the picking-fingers.

Having thus described my invention, the following is what I claim as new therein and desire to secure by Letters Patent:

1. In a cotton-harvester, the combination of a suitable casing, a rotatable hollow stem carried in said casing and adapted to be alternately protruded outside the casing and retracted within it, by endwise movement; a series of picking points or prongs carried in said hollow stem and adapted to be protruded radially from the stem and retracted within the same; means for projecting the stem longitudinally outside the casing and projecting the points or prongs radially from the stem while the latter is in such projected position; means for imparting rotation to the projected stem and means for withdrawing the stem within the casing while the picking-teeth are projected therefrom and subsequently retracting the teeth within the hollow stem, substantially as described.

2. In a cotton-harvester, the combination of a casing carried on wheels; a series of rotatable and longitudinally-movable hollow stems carried within said casing; means for projecting said stems endwise beyond the wall of the casing and retracting them within the same, and imparting rotary motion thereto when in projected position; a series of picking points or prongs carried in each hollow stem, adapted to be projected radially therefrom and retracted within the same, and means for so projecting said points or prongs radially from the hollow stems while the latter are in projected position and withdrawing them within the stems after the latter have been retracted within the frame, substantially as described.

3. In a cotton-harvester, the combination of a suitable frame and casing, a series of rotatable picking members mounted in said casing normally out of operative position and having projectable points or prongs, means for first projecting said picking members into operative position and then projecting said points or prongs, and means for rotating the picking members while in projected position.

4. In a cotton-harvester, the combination with a suitable frame, of a series of picking members suitably mounted on said frame, and having points or prongs seated therein and adapted to be projected therefrom, movable rack-bars engaging said picking members and adapted to rotate the same, means for actuating said rack-bars, and means for projecting and retracting said points or prongs.

5. In a cotton-harvester, the combination of a suitable frame and casing, a series of picking members suitably mounted in said casing normally held out of operative position and having projectable points or prongs, means mounted on the frame, connected to and adapted to project said picking members longitudinally from the casing and retract them within it, means to project the points or prongs radially from the periphery of the picking members and retract them within the same, and means connected to said picking members for rotating them while in projected position.

6. In a cotton-harvester, the combination with a suitable frame and casing, a collecting-compartment formed in said casing, a series of picking members mounted in said casing normally retracted from operative position and having projectable points or prongs, means for projecting said picking members into operative position and for projecting said points or prongs after the said picking members have been projected into operative position, means for rotating said picking members while in projected position, and means for removing cotton from said picking members to said compartment.

7. In a cotton-harvester, the combination with a suitable frame and casing, a collecting-compartment therein, a series of picking members normally retracted from operative position and having projectable points or prongs, a suitable gearing connected to said picking members and adapted to project the said picking members into operative position, means actuated by said gearing for projecting said points or prongs after the picking members have been projected into operative position, means for rotating said picking members, and means for discharging cotton from said picking members to said compartment after the picking members have been retracted within the casing.

8. In a cotton-harvester, the combination of a suitable frame and casing, a collecting-compartment in said casing, a series of picking members held normally retracted from operative position within the casing and having a series of projectable points or prongs, relatively movable actuating-plates mounted in said casing, means for feeding said plates forward, one of said plates being rigidly connected to one end of the said picking members, the other of said plates being connected to the said points or prongs, means for rotating said picking members while in projected position, and means for removing cotton from said picking members to said compartment.

9. In a cotton-harvester, the combination of a suitable frame and casing, a collecting-compartment therein, a series of picking members held normally retracted from operative position within the casing and having projectable points or prongs, of a movable plate rigidly connected to one end of said picking members, a second movable plate connected to said points or prongs, spring connections between the said plates, means for feeding the said plates forward or backward, means for producing a relative movement between said plates, means for rotating said picking members, and means for removing cotton from said picking members to said compartment.

10. In a cotton-harvester, a picking member comprising a cylinder or tube, suitable perforations in said cylinder or tube, an actuating rod or bar slidably mounted in said cylinder or tube, and a series of points or prongs mounted on said rod or bar and seated in said perforations.

11. In a cotton-harvester, a picking member comprising a cylinder or tube, a series of perforations in said cylinder or tube, an actuating rod or bar slidably mounted in said cylinder or tube, a series of radial points or prongs mounted on said bar or rod and seated in said perforations, and means spacing said points or prongs apart.

12. In a cotton-harvester, a picking member comprising a cylinder or tube, a series of diagonal perforations in said cylinder or tube, an actuating rod or bar slidably mounted in said tube, a series of plates mounted on said bar, means spacing said plates apart, and a series of radial points or prongs carried by each of said plates.

13. In a cotton-harvester, the combination of a suitable portable frame and casing, a collecting-compartment therein, a series of picking members mounted in said frame normally retracted within said casing, and having projectable points or prongs, means for projecting said picking members from said casing, means for projecting the points or prongs after the projection of the picking members, means for rotating the picking members while in projected position and while said points or prongs are projected therefrom, means for retracting the picking members within the casing, and means for removing cotton from said picking members to said compartment.

14. In a cotton-harvester, the combination of a portable frame and casing, a collecting-compartment therein, a series of picking members mounted in said frame normally retracted within said casing and having projectable points or prongs, means for projecting and retracting the said picking members from and into the said casing, means for projecting and retracting the said points or prongs after the projection and retraction respectively of the said picking members, means for rotating the said picking members while in projected position and while the said points or prongs are projected therefrom, and means for removing cotton from said picking members after the same have been retracted into the said casing.

15. In a cotton-harvester, the combination of a portable frame and casing having a series of perforations in the side thereof, a stripping-partition mounted within said casing, a series of picking members mounted in said stripping-partition and having projectable points or prongs therein, means for projecting and retracting the said picking members through the perforations in the said casing, means for projecting and retracting the said points or prongs after the projection and retraction respectively of the said picking members, and means for rotating the said picking members while in projected position and while the said points or prongs are projected therefrom said partition being adapted to strip cotton from the said picking members during the latter part of their retraction.

16. In a cotton-harvester, the combination of a suitable casing, a cotton-receiving compartment therein, a picking member mounted in said casing and having projectable points or prongs, means for projecting and retracting the said picking member into and out of operative position without the casing, means for projecting the said points or prongs after the projection of the said picking member and for retracting the said points or prongs after the retraction of the said picking member within the casing, means for stripping cotton from the said picking member after the retraction of the said points or prongs, and means for rotating the said picking member while in its projected position.

17. In a cotton-harvester, the combination of a suitable casing, a cotton-receiving compartment therein, a collapsible frame in said casing, a picking member mounted upon said frame and having a series of projectable points or prongs, means for projecting said points or prongs upon the collapse of the said frame, means for moving said frame to move the said picking member into operative position, means for collapsing the said frame after the said picking member has been projected into operative position to project the said points or prongs, means for rotating the said picking member while in its projected position, means for locking the said frame in its collapsed position, means for retracting the picking member, means for automatically releasing the said frame from its collapsed position after retraction of the said picking member within the casing, and means for stripping cotton from the said picking member after the latter has been retracted within the casing.

18. A cotton-picking machine comprising a carrying-frame, a series of rotatable pickers mounted to slide longitudinally therein, and means for projecting said pickers by movement in the lines of their respective axes, rotating them while in projected position and subsequently retracting them without lateral motion in the frame.

19. In a cotton-harvester the combination of a suitable carrying-frame, picker-heads slidably and rotatably mounted therein and carrying a number of retractable teeth or prongs, and means whereby the picker-heads are projected longitudinally from the frame without lateral movement and the teeth or prongs projected therefrom and the picker-heads then rotated to gather the cotton and then retracted while the teeth or prongs are still in projected position and the teeth or prongs subsequently retracted to discharge the cotton, substantially as described.

20. In a cotton-picking machine, the combination of a carrying-frame adapted to be moved step by step to position adjacent to the successive plants, a series of rotatable pickers guided longitudinally without lateral motion in the frame, projectable and retractable teeth or prongs carried by said pickers, and manually-operated means for projecting the pickers then projecting the teeth or prongs therefrom, then rotating and subsequently retracting the pickers and afterward retracting the teeth or prongs, while the carrying-frame is at rest, substantially as described.

21. In a cotton-picking machine, a rotary picker-head made up of rings forming approximately radial guides, teeth or prongs occupying said guides, a carrying member for the teeth or prongs, and means for imparting longitudinal movement to the carrying member and thereby forcing the teeth or prongs outward through the guides, substantially as described.

22. In a cotton-picking machine, a rotary picker-head consisting of an outer member made up of annular sections forming guides for projectable teeth or prongs, an inner member movable longitudinally in the outer member and a series of teeth or prongs hinged to the inner member occupying the guides in the outer member and projected radially by the longitudinal movement of the inner member, substantially as described.

23. In a cotton-picking machine, a rotary picker-head made up of an inner sliding member, rigid teeth or prongs hinged to said inner member, and an outer member within which said inner member slides longitudinally having oblique guiding-perforations occupied by the teeth or prongs and of larger diameter than said teeth or prongs, whereby the longitudinal movement of the inner member is permitted and effects radial projection of the teeth or prongs, substantially as described.

24. In a cotton-picking machine, a rotary picker-head made up of an inner sliding member, rigid teeth or prongs hinged to said inner member and an outer member within which said inner member slides longitudinally, having oblique guiding-perforations occupied by the teeth or prongs and of larger diameter than said teeth or prongs whereby the longitudinal movement of the inner member is permitted and effects radial projection of the teeth or prongs, and means for imparting longitudinal motion to the inner member, substantially as described.

25. In a cotton-harvester, the combination of a suitable carrying-frame, picking members mounted in said frame each comprising a perforated cylinder or tube and a series of projectable points or prongs seated in the perforations of the cylinder or tube, means for projecting and retracting the points or prongs in the cylinder or tube, means for projecting the cylinder or tube longitudinally into the cotton-plant and retracting it therefrom while the carrying-frame is at rest, and means for rotating the cylinder or tube while in projected position and while the points or prongs are projected therefrom for picking the cotton, substantially as described.

THEODORE H. PRICE.

Witnesses:
A. C. MASON,
S. R. JOHNSON.